(12) United States Patent
Otterstedt et al.

(10) Patent No.: US 6,496,119 B1
(45) Date of Patent: Dec. 17, 2002

(54) PROTECTION CIRCUIT FOR AN INTEGRATED CIRCUIT

(75) Inventors: Jan Otterstedt, Munich (DE); Michael Richter, Ottobrunn (DE); Michael Smola, Munich (DE); Martin Eisele, Munich (DE)

(73) Assignees: Infineon Technologies AG, Munich (DE); Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/582,841

(22) PCT Filed: Nov. 4, 1999

(86) PCT No.: PCT/EP99/08456
§ 371 (c)(1),
(2), (4) Date: Sep. 20, 2000

(87) PCT Pub. No.: WO00/28399
PCT Pub. Date: May 18, 2000

(30) Foreign Application Priority Data

Nov. 5, 1998 (EP) .............................. 98120986
Apr. 15, 1999 (DE) ........................... 199 17 080

(51) Int. Cl.⁷ .............................................. G08B 21/00
(52) U.S. Cl. ...................... 340/653; 340/635; 361/45
(58) Field of Search ................ 340/635, 653; 361/45

(56) References Cited

U.S. PATENT DOCUMENTS

| 4,593,384 A | 6/1986 | Kleijne |
| 4,882,752 A | 11/1989 | Lindmann et al. |
| 5,389,738 A | 2/1995 | Piosenka et al. |
| 5,489,840 A | * 2/1996 | Caron ........................ 361/93 |
| 5,969,921 A | * 10/1999 | Wafer et al. ................. 361/45 |
| 6,094,329 A | * 7/2000 | Heinz et al. ................. 361/45 |

FOREIGN PATENT DOCUMENTS

WO    WO 96/00953    1/1996

OTHER PUBLICATIONS

Mori, R. et al., "Superdistribution: The Concept and the Architecture", Transactions of the Institute of Electronics, Information and Communication Engineers of Japan, vol. E73, No. 7, Jul. 1990, XP002010383, pp. 1133–1146.

* cited by examiner

Primary Examiner—Daniel J. Wu
(74) Attorney, Agent, or Firm—Schiff Hardin & Waite

(57) ABSTRACT

The invention is directed to a protective circuit for an integrated circuit 1. This protective circuit is preferably arranged in a plurality of circuit levels 2, 3 under and/or above the intergrated circuit 1. It exhibits a plurality of interconnects 10, 11 that are charged with different signals of one or more signal generators. The different signals, after traversing the interconnects 10, 11, are analyzed with one or more detectors in that the signals received by detectors are respectively compared to rated reference signals, and an alarm signal is forwarded to the integrated circuit given the presence of a significant difference. On the basis of this alarm signal, the integrated circuit is switched into a security mode that makes an analysis or a manipulation of the integrated circuit practically impossible.

16 Claims, 3 Drawing Sheets

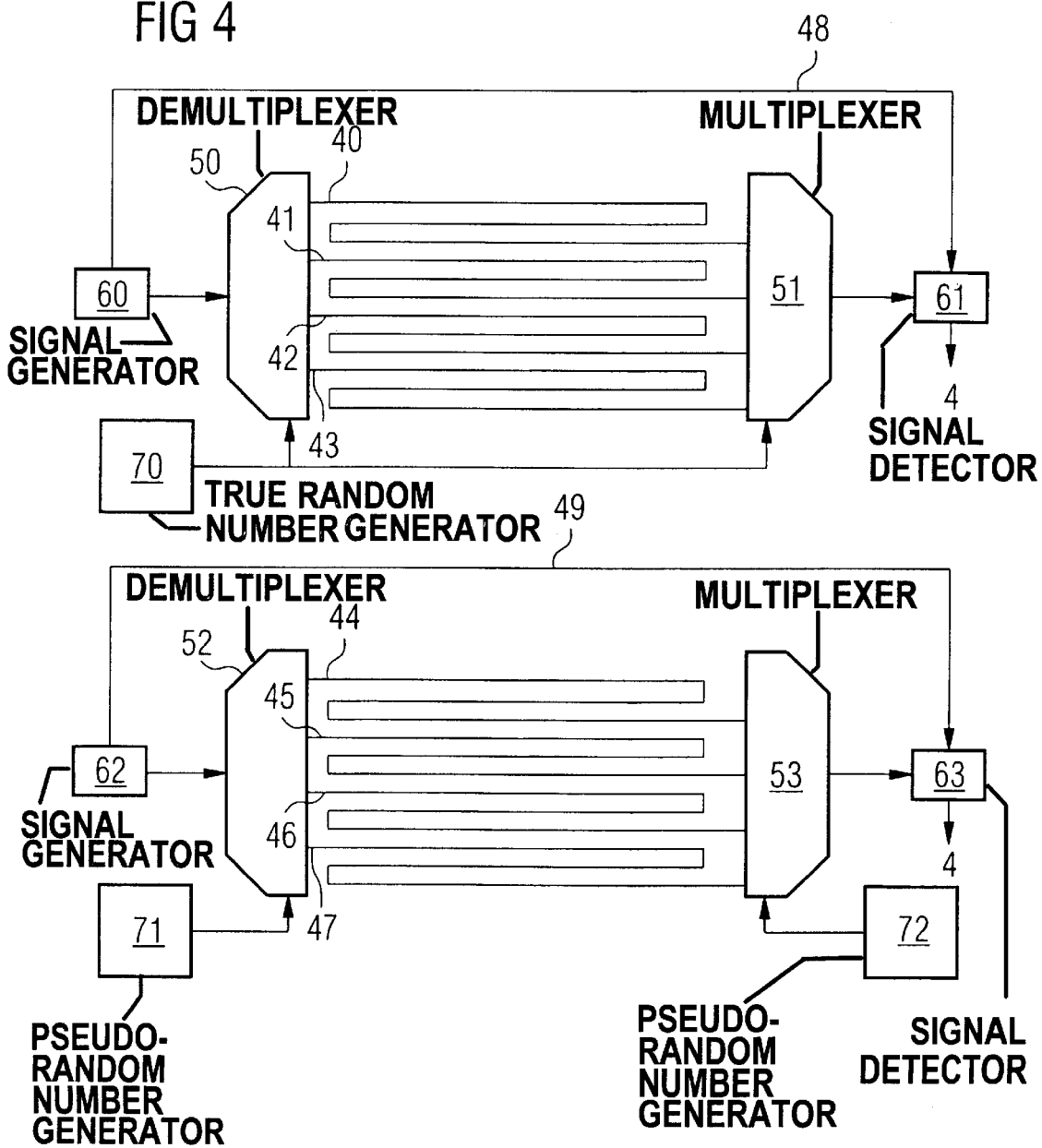

PROTECTION CIRCUIT FOR AN INTEGRATED CIRCUIT

BACKGROUND OF THE INVENTION

1. Field of the Invention

The invention is directed to a protective circuit for an integrated circuit.

2. Description of the Related Art

Certain forms of electronic circuits, particularly integrated circuits for use in chip cards, require a high degree of secrecy of circuit information or of internal chip data. This security-relevant information must be protected both against foreign analysis as well as against manipulation.

Various approaches have been used to achieve this protection. For example, integrated circuits have been provided with a metallic sleeve of, for example, silver or titanium which can prevent a readout of the integrated circuits with X-rays. A further approach has been to arrange an interconnect in the highest circuit level of an integrated circuit as shield line and to monitor the physical properties such as the resistance, the capacitance, etc., thereof. When a change is detected, for example, due to short-circuiting, grounding or parting during undesired observation or manipulation, an alarm signal is then triggered. Such a protective circuit is disclosed by U.S. Pat. No. 5,389,738. These types of protective circuits, however, are inadequate since the anticipated physical properties can be simulated with suitable external measures and the protective circuit can consequently not detect an outside attack by observation or manipulation and, thus, no suitable counter-measures can be taken.

SUMMARY OF THE INVENTION

The invention is based on the object of specifying a protective circuit for integrated circuits that provides greater protection against unwanted observation or manipulation.

This object is achieved by a protective circuit for an integrated circuit, wherein the protective circuit is arranged in a circuit level at a location under or above the integrated circuit, the protective circuit comprising a plurality of interconnects that are charged with different signals of a signal generator, a detector that evaluates the different signals transmitted via the plurality of interconnects for faulty behavior, the detector having an output at which, when the faulty behavior is found, a control signal is provided for switching the integrated circuit into a security mode.

The inventive protective circuit is arranged in at least one circuit level above or below the integrated circuit as well. This protective circuit thereby exhibits one or more interconnects that are charged with signals that change over time or with different signals as well. These signals are transmitted via the interconnects and are subsequently investigated by the detector or detectors in that the received signal to be investigated is respectively compared to a reference signal, i.e., the anticipated signal. When one or more detectors find a significant deviation, then this triggers an alarm signal that switches the integrated circuit into a security mode. In this mode, for example, the content of the memory cells can be erased, so that the control programs and the stored data can no longer be read out and interpreted.

By employing a plurality of different signals that are conducted over a plurality of interconnects and subsequently analyzed by the various detectors, it is nearly impossible to supply all alarm-triggering signals in the correct way from the outside during an attempted readout or manipulation and to simulate the presence of these signals for the detectors. When, for example, the integrated circuit is planarly mechanically eroded from above such that it is possible to view the circuit levels of the integrated circuit lying therebelow, then the interconnects of the protective circuit lying above are affected first, which leads to a modification or, to an interruption of the signal transmission that is detected by one or by several detectors. This is also true when individual interconnects are tapped with miniature needles, resulting in modifications of, for example, the signal shape, the signal attenuation or the like. All of these modifications then regularly cause an error recognition by various detectors.

Inventively, thus, it is not only a single signal but a plurality of different signals that must be simulated. Precisely in view of the extremely limited spatial conditions of an integrated circuit, it is nearly impossible to specifically supply this plurality of simulated signals to the various detectors. A nearly all-embracing protection of the integrated circuit by the protective circuit arranged above is thus established.

Preferably, the integrated circuit is surrounded in a sandwich-like manner by a protective circuit above and a protective circuit below the integrated circuit, so that an observation or manipulation from both above as well as below is precluded by the protective circuits.

It has proven successful to fashion the detectors such that, in the evaluation of the transmitted signals, these signals are investigated for integrity, which can especially ensue with a CRC check, with a checksum comparison, with a parity check or with other signature comparisons. As a result of this integrity comparison between the transmitted signal and the integrity value of the anticipated signal, also referred to as reference signal, it is possible to prevent a manipulation of the protective circuit in which the detector is quasi-shorted, whereby one and the same signal is forwarded both as reference signal and as transmitted signal to the detector with a mere identity comparison for detecting improper behavior.

The different signals that are supplied to the different interconnects can be realized with a common signal generator or can also be realized by a plurality of individual signal generators. Preferably, the generator or generators is/are in communication with the detectors resulting in the respective detector receiving information about the type and nature of the anticipated signal, (the reference signal,) from the generator allocated to it. It is thus possible that the generators dynamically modify their output signals and inform the detectors of this modification, which makes the simulation of the signals even more difficult in an attack since the time curve of the signals is also taken into consideration, It has proven especially advantageous to extend the interconnects over a plurality of circuit levels, resulting in a significantly better coverage of the integrated circuit to be protected. Similar to the view into the structure of the integrated circuit over a plurality of circuit levels (and, thus, a view into the type and nature of the generation, of the signal guidance and of the detection of the various signals) is also significantly more difficult and is thereby not easy to simulate externally. Consequently, each modification of the protective circuit by an intervention from the outside leads to a detection of the faulty behavior, since a simulation is extremely difficult or nearly impossible due to the extremely difficult, three-dimensional structure of the fashioning of the interconnect or, the guidance therefor. It is thus clear that the one circuit level of the protective circuit protects the other circuit level of the protective circuit against an analysis. An extremely far-reaching and dependable protective circuit for the integrated circuit is definitely established by this approach.

According to a preferred embodiment of the protective circuit, the interconnects of the protective circuit are fashioned such that, ideally, they largely completely planarly cover the integrated circuit to be protected. This is done in a manner such that, when looking through the protective circuit onto the integrated circuit, there is no longer any possibility of directly reaching the protective circuit, for example, through bores or the like, i.e. without damaging the interconnects of the protective circuit. This far-reaching or complete coverage is enabled in a simple and sure way by precisely fashioning the interconnects over a plurality of circuit levels or in a plurality of circuit levels, since the interconnects can be arranged in a plane with adequate spacing from one another to prevent crosstalk. The region between the interconnects can just be covered by interconnects in the other circuit level of the protective circuit, enabling a complete coverage of the integrated circuit or, respectively, of the critical parts of this integrated circuit.

An attempt made to approach the integrated circuit, for example with a bore, leads to damage to one of the interconnects, which leads to a modified signal. When the interconnect is fashioned with an extremely slight interconnect width that corresponds to the size of such a bore or is smaller, then each such bore leads to an interruption of the interconnect and, thus, to a fault signal that can be very reliably detected. It is also possible that such a bores would lead to a short between various interconnects, which can also be very dependably recognized as fault signal by the corresponding detectors as a total signal fade. The interconnect width is thereby preferably selected such that it corresponds to the minimum interconnect width given a specific chip technology employed. Due to these specific fashionings of the interconnects as, on the one hand, very narrow interconnects and as, on the other hand, interconnects extending over various circuit levels as well as with optimum surface coverage, an extraordinary degree of protective effect against a mechanical intervention (e.g., boring or plaining) is established.

According to a preferred embodiment of the invention, the detector or detectors of the protective circuit are arranged in a circuit level under the highest circuit level having interconnects of the protective circuit and are protected against unwanted access by these interconnects. A cascading protection for the detectors of the protective circuits by the interconnects of the protective circuits and for the integrated circuit by the interconnect with detectors is established by this systematic structure.

An observation or manipulation of the detector or detectors is prevented by this arrangement due to the lines lying above the detector(s), which precludes another possibility of an attack in which signals could be directly supplied into the detectors without proceeding via the interconnects.

In a corresponding way, it is advantageous to arrange the generator or generators in a circuit level that is protected by interconnects of the protective circuit lying above it. Such an arrangement of the detectors or, respectively, of the generators definitely proves to be a critical way of enhancing the protective effect of the protective circuit against unauthorized access.

When the different signals are generated completely independently of one another, for example, by independent generators, then it is assured that these signals differ significantly in terms of their signal curve, since they do not systematically depend on one another. Such signals can only be simulated with extreme outlay and with extreme difficulty, especially since the plurality of different signals must be supplied in a targeted fashion into the correct interconnects or, respectively, the correct detectors. This is nearly impossible given the extremely restricted spatial dimensions of the integrated circuit. Such a protective circuit has proven particularly successful in protecting an integrated circuit.

In one version of the invention, a plurality of detectors are allocated to one interconnect, these detectors tapping the signal on the one interconnect at a position specific to the respective detector and monitoring it. In this construction, the interconnect is divided into several interconnect sections that are each respectively monitored by detectors allocated to them. These interconnect sections thus assume the function of a monitored interconnect. Over and above this, however, the multiple monitoring of the entire interconnect with the various interconnect sections assures that, if an intervention into this interconnect with suitable intervention measures were not to be detected by one detector, the other detectors or some of the other detectors at the overall interconnect will find a variation of the monitored signal and trigger an alarm. The redundant arrangement of the detectors at an interconnect thus establishes an enhanced protective effect of the protective circuit.

In general, it is desirable to provide optimally many signal lines and optimally many signal generators or detectors that complicate an attack in the form of reconfiguration merely due to their number. Limits, however, are placed on the number of signal lines/generators/detectors dependent on the size of the integrated circuit, since many discrete signals mean a high hardware expenditure, which leads to the circuit becoming significantly more expensive due to these security measures.

In another version of the invention, the above-described method of protective signal generation is combined with a multiplexer and a demultiplexer, where different interconnects of the protective shield are connected to the same generator outputs and detector inputs at different times on the basis of a time-division multiplex method. In this way, the number of generators and detectors is smaller than the number of shield segments.

A further advantage of this arrangement is that the number of reference lines that supply the detectors with a reference signal from the appertaining detector is likewise reduced, which leads to a considerable saving of chip area.

The multiplexers and demultiplexers can either be centrally synchronously controlled or their status may be dependent only on the plurality of past clock cycles of the common clock system. A random or pseudo-random drive of the multiplexer channels is especially advantageous. A true random drive requires an ongoing synchronization of multiplexer and demultiplexer with specific control signals. A pseudo-random drive allows a local generation of identical control signals in the respective spatial proximity of multiplexer and demultiplexer.

According to an especially preferred embodiment of the protective circuit and given a plurality of detectors, the detectors are networked with one another.

What this achieves is that the integrated circuit is driven such as soon as one detector identifies a faulty behavior and, by inference, an unallowed attack on the integrated circuit that the intergrated circuit is switched into a comprehensive security mode. Via the networking, it is also possible that the individual detectors check the functionability/presence of the other detectors in the framework of an acknowledgment function or in the framework of a watchdog function and thereby recognize an unallowed intervention into the protective circuit or, respectively, the integrated chip and trigger the corresponding security mode of the integrated circuit.

In addition to networking the detectors, it has also proven advantageous to network the generators, which permits recognition of a failure intervention in a generator. Over and above this, the networking of the generators with the detectors makes it possible for the generators to provide the detectors allocated to them with information about the signals they output, for example, about the time curve, about their level, about their shape or the like. As a result thereof, the variability of the different signals and, thus, the degrees of freedom of the protective circuit can be significantly enhanced, which makes intervention more difficult and thereby significantly enhances the protective effect of the protective circuit against an unnoticed attack on the integrated circuit.

The inventive protective circuit thus exhibits the underlying idea of decentralization the components of the protective circuit are no longer locally concentrated but instead are distributed over a larger spatial area, multiplying in number and fashioning them in a differentiated manner. This permits the and the transport via the interconnects and the monitoring of the signals to be distributed onto a plurality of redundant units, which leads to greater protection against an unnoticed observation or manipulation of the protective circuit or respectively, of the integrated circuit to be protected.

BRIEF DESCRIPTION OF THE DRAWINGS

Inventively protective circuits for integrated circuits and their advantages are explained in greater detail below on the basis of exemplary embodiments with the assistance of drawings.

FIG. 4 is a schematic diagram showing a circuit structure of a further inventive protective circuit with demultiplexer/multiplexer arrangements.

DESCRIPTION OF THE PREFERRED EMBODIMENTS

Figure 1:
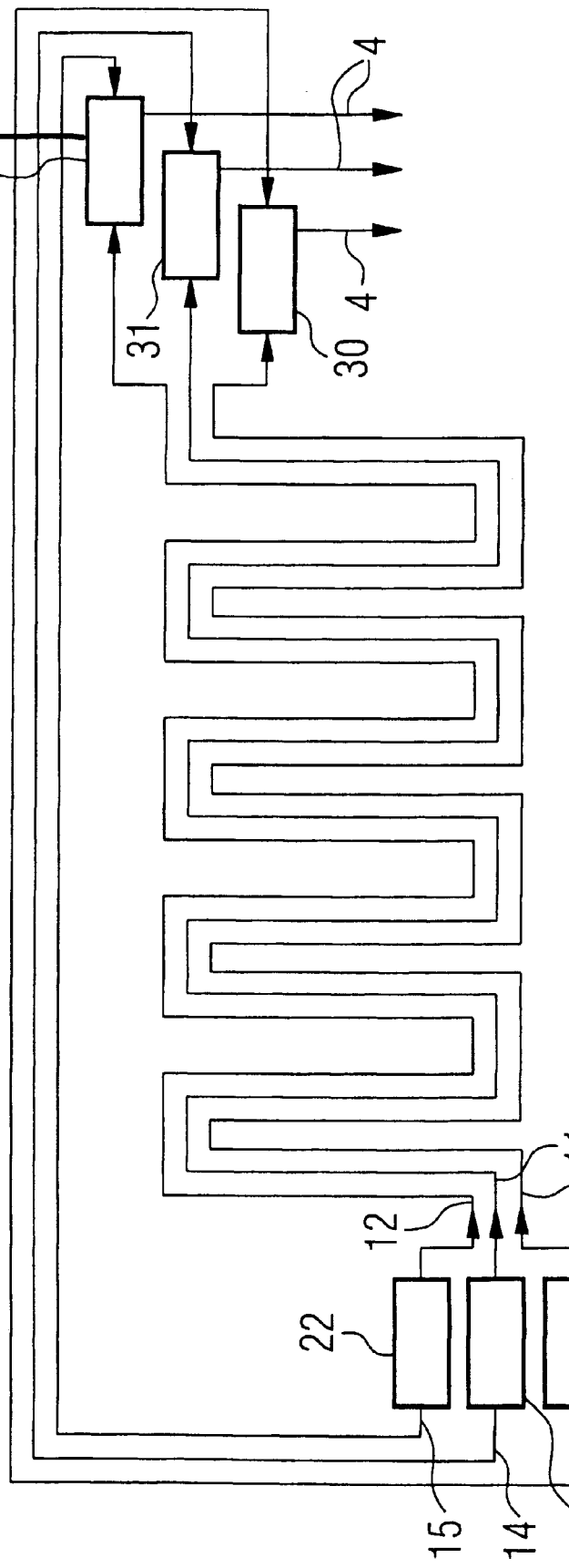
FIG. 1 is schematic diagram showing a circuit structure of an inventive protective circuit with a signal generator and one signal detector per interconnect.

FIG. 1 schematically shows the structure of a protective circuit for an integrated circuit. It shows three interconnects 10, 11, 12 that are separated from one another and proceed parallel. These interconnects 10, 11, 12 have a winding patter and cover a certain region in a circuit level of the integrated circuit.

The interconnects 10, 11, 12 are respectively connected to their own signal generator 20, 21, 22. Signals that are independent of one another and, thus, also fundamentally different are supplied into the interconnects via the signal generators 20, 21, 22. The supplied signals traverse the interconnects 10, 11, 12 and are analyzed at the end of the interconnects 10, 11, 12 with a detector 30, 31, 32 allocated to each interconnect.

In the scope of this analysis, the different signals received via the interconnects 10, 11, 12 are compared to the reference signal provided in via connecting lines 13, 14, 15 between the generators 20, 21, 22 and the detectors 30, 31, 32 allocated to them. The reference signals either directly represent the signals the way they appear after traversing the interconnects 10, 11, 12 or they provide the information needed in order to determine the required information for the reference signals from them.

The evaluation in the detectors 30, 31, 32 ensues in that the reference signals are compared to the arriving signals received via the interconnects 10, 11, 12. When a difference is found, an alarm signal is generated as control signal for the integrated circuit and is conducted to the integrated circuit via the alarm line 4 allocated to each detector 30, 31, 32.

On the basis of this alarm signal, the integrated circuit is then switched into a condition that is referred to as a security mode. In this security mode, for example, the contents of the memory cells can no longer be read out since, for example, they are completely erased after the switch into the security mode and the information contained therein has thus been irretrievably lost. This prevents reading out or manipulating the important information of the integrated circuit contained in program and data memories, for example, code Keys, PIN numbers or personal data of the user.

Due to the multiple, decentralized fashioning of the interconnects 10, 11, 12, of the signal generators 20, 21, 22 and of the detectors 30, 31, 32, it is extremely difficult to fool this protective circuit by supplying external signals in order to obtain more detailed information about the integrated circuit to be protected, for example, on the basis of a planing process or drilling process or the like.

Due to the necessity of simulating not only one signal but of plurality of different signals simultaneously at different locations for different detectors that are arranged on a very spatially limited region, it is nearly impossible to carry out an attack on the integrated circuit without determination of a signal modification and, thus, faulty behavior implying an attack on the protective circuit with the integrated circuit to be protected. When a detector 30 detects a faulty behavior of the signal of the interconnect 10 supplied to it, then— independently of the other detectors 31, 32—it will forward an alarm signal to the integrated circuit via the alarm line 4 and thereby trigger the security mode.

Due to the winding parallel pattern of the interconnects 10, 11, 12, a largely closed area-covering interconnect structure is established that protects the integrated circuit lying therefor, and or at least a region of it against access through these interconnects 10, 11, 12. If someone were to attempt to get at the integrated circuit lying under the interconnects 10, 11, 12 with a mechanical means, then he would be largely forced to damage or entirely interrupt one of the interconnects 10, 11, 12, which would lead to a significant change of the signal transmitted via this interconnect. Such a significant change is identified as faulty behavior by the detector 30, 31, 32 allocated to this interconnect and the detector outputs a corresponding alarm signal.

The interconnects 10, 11, 12 are fashioned with such a narrow interconnect width that any drilling for defeating the circuit levels 2, 3 of the protective circuit leads to an interruption of an interconnect. To that end, it is necessary to select the spacing of the individual interconnects 10, 11, 12 very small and to arrange the interconnects in the circuit level or levels with a tight winding. An absolutely reliable interruption due to an observation or manipulation to be prevented is in fact established in that the signal on this interrupted interconnect 10, 11, 12 is completely interrupted and interpreted as an attack.

Figure 2:
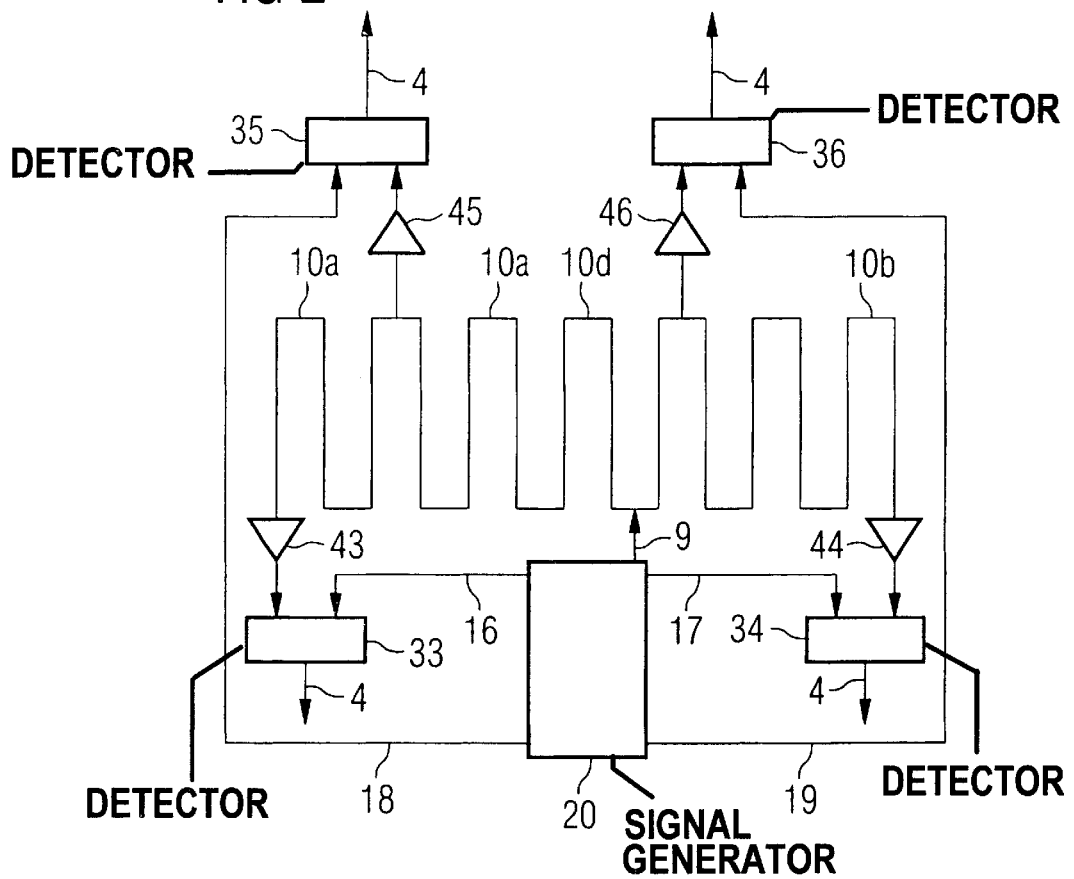
FIG. 2 is a schematic diagram showing a circuit structure of another embodiment protective circuit.

The signals generated by the generators 20, 21, 22 are specific signals, usually digital but also analog, that allow a modification on the transmission path via the interconnect 10, 11, 12 to appear clearly in a signal processing, FIG. 2 schematically shows an embodiment of a further protective circuit. Here, a single interconnected interconnect structure is provided that exhibits a feed point 9 for a signal formed by the one signal generator 20 into the interconnect structure.

Four positions for outfeed of a signal transmitted via the interconnect structure are provided at the interconnect structure. Each of these outfeed positions is provided with an amplifier 43, 44, 45, 46 for amplifying the outfed signal. These amplified signals are subsequently supplied to the detectors 33, 34, 35, 36. The interconnect structure, dependent on the respective tapping point, forms the interconnect 10a, i.e., the interconnect structure between the feed point 9 and the tap point of the amplifier 43 for the detector 33, the interconnect 10b between the feed point 9 and the tap point defined by the amplifier 44 for the detector 34, the interconnect 10c between the feed point 9 and the tap point for the amplifier 45 for the detector 35, and the interconnect 10d between the feed point 9 and the tap point for the amplifier 46 for the detector 36.

Each of the detectors works independently of the other detectors and can drive the integrated circuit via its alarm line 4 such that the integrated circuit is switched into the security mode.

The generator 20 is connected via the connecting lines 16, 17, 18, 10 to the detectors 33, 34, 35, 36 and provides these detectors with the specific information for the reference signals for monitoring the interconnect 10a, 10b, 10c, 10d. In a software-controlled manner, the generator 20 randomly selects the type of the infed signal and signals the form of the infed signal to the detectors 33, 34, 35 via the corresponding connecting lines 16, 17, 18, 19. The detectors 33, 34, 35 interpret the signal supplied to them by the generator 20 via the connecting line 16, 17, 18, 19 in that they compare this signal to the signal of the interconnect 10a, 10b, 10c, 10d supplied from the tap points. When a significant difference, i.e. a discrepancy, is found, then each detector 33, 34, 35, 36, independently of the others, outputs an alarm via its alarm line 4 which switches the integrated circuit into the security mode.

What the overlapping, interconnected fashioning of the interconnect 10a. 10b, 10c, 10d achieves is that an intervention in the interconnect of the interconnect system leads to modification of not only one interconnect 10a, 10b, 10c, 10d but to a modification of the signal on a plurality of interconnects 10a, 10b, 10c, 10d at the same time. In the case of an unwanted observation or manipulation, it is not only the signal of one detector but of a plurality of detectors, particularly all detectors 33, 34, 35, 36, of this interconnect system that would have to be charged with a simulated and correct signal. This signal must correspond in shape and type and in time curve to the reference signal that the generator 20 supplies via the connecting line 16, 17, 18, 19 to the detectors 33, 34, 35, 36 either indirectly or directly. It is thus clear that the illustrated generator 20 is in the position—software-controlled—to dynamically modify the signal fed in at the feed point 9 and to thereby largely preclude the observation or manipulation of the protective circuit and, thus, of the integrated circuit 1 protected by the protective circuit.

Figure 3:
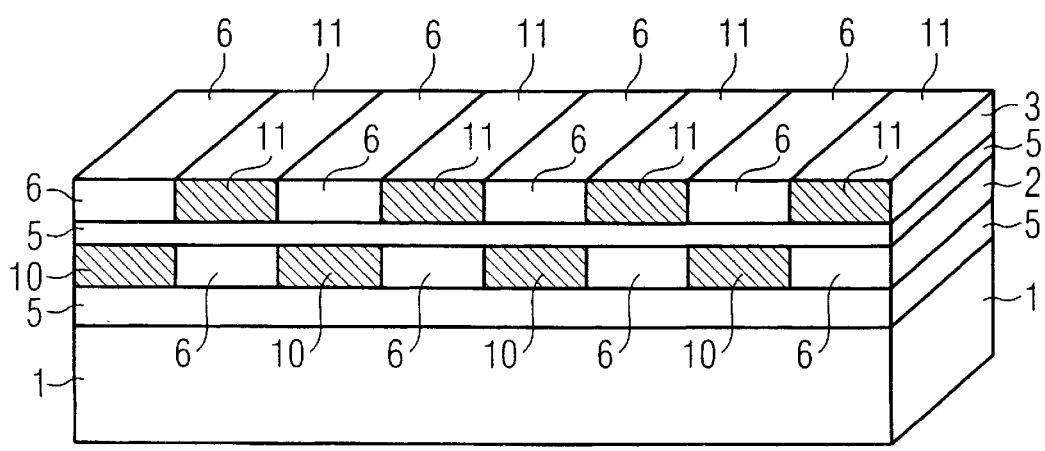
FIG. 3 is a section view through an integrated circuit with protective circuit.

FIG. 3 shows the layered structure of the integrated circuit 1 with the protective circuit arranged above it. The illustration of a corresponding second protective circuit at the underside of the integrated circuit is not shown in FIG. 3, but such a second protective circuit at the other side of the integrated circuit 1 has a structure corresponding to that of the protective circuit shown here.

The protective circuit is arranged above the integrated circuit 1. It exhibits two circuit levels 2, 3 lying above one another that are separated with an insulation layer 5 from one another and from the integrated circuit 1 to be protected. An electrical short between the interconnects 10, 11 and the integrated circuit 1 is prevented by this insulation layer.

The interconnects 10 are fashioned stripe-shaped in the first circuit level 2 and are separated from one another by stripe-shaped insulation regions 6. The interconnects 10 are arranged parallel to one another in the first circuit level 2. A second circuit level 3 that exhibits corresponding, stripe-shaped interconnects 11 arranged parallel to one another is arranged above the circuit level 2. These interconnects 11 are also separated from one another by insulation regions 6 and are thus insulated from one another. The interconnects 10 are arranged such that, in cooperation with the interconnects 11, they completely cover the integrated circuit to be protected. This complete coverage is achieved when, looking through the first and second circuit level 2, each point of the integrated circuit to be protected or, respectively, each point to be protected in the integrated circuit 1 is covered either by the interconnects 10 or by the interconnects 11 or both by the interconnects 10 as well as the interconnects 11.

When someone wishes to access the integrated circuit 1 to be protected, then he must first penetrate the protective circuit and thereby punch through the circuit levels 2, 3 and damage at least one of the interconnects 10, 11 since the integrated circuit is completely covered. Such damage, which, for example, can represent a complete interruption of the interconnects or a short between the interconnects in one circuit level 2, 3 or between the circuit levels 2, 3 or merely a partial destruction of the interconnect 10, 11, leads to a clear modification of the transmitted signal. This transmitted signal is compared to the anticipated reference signal by the allocated detector, and is interpreted as an error signal and, thus, as an attack on the protective circuit or, respectively, on the integrated circuit 1 to be protected, which leads to the output of an alarm signal to the integrated circuit 1. This alarm signal then switches the integrated circuit 1 into the security mode.

The generators 20, 21, 22 (not shown here) or the corresponding detectors 30 through 36 (not shown here) are arranged in the first circuit level 2 protected by the circuit level 3 lying above it with the correspondingly arranged interconnects 11. This arrangement may be distributed over the entire first circuit level 2, which clearly restricts the possibilities of defeating the protective circuit.

FIG. 4 shows an exemplary embodiment of a development of the invention with eight interconnects 40 . . . 47. These eight interconnects 40 . . . 47 are subdivided into two groups of four interconnects 40 . . . 43 and 44 . . . 47. Only one signal generator 60 or, respectively, 62 and one signal detector 61 or, respectively, 63 is allocated to each of the two groups. The signals of the signal generators 60, 62 are supplied to the interconnect groups 40 . . . 43 or, respectively, 44 . . . 47 via demultiplexers 50 or, respectively, 52, and the signals transmitted via the interconnects are supplied to the signal detectors 61 or, respectively, 63 via multiplexers 51 or, respectively, 53.

In order to be able to supply the signal detectors 61, 63 with the required reference signals, only one connecting line 48 or, respectively, 49 is required per interconnect group given this development of the invention. The signal detectors 61, 63 also indicate when the signal received via the multiplexers 51, 53 does not agree with the anticipated signal via the alarm lines 4.

Two different possibilities for driving the demultiplexers 50, 52 and multiplexers 51, 53 are shown given the illustrated exemplary embodiment with two interconnect groups 40 . . . 43 and 44 . . . 47. Given the interconnect group 40 . . . 43 shown in the upper part of FIG. 2, the demultiplexer 50 and the multiplexer are driven in common by a true random number generator 70 to select one of the interconnects 40 . . . 43. Given the interconnect group 44 . . . 47 shown below it the appertaining demultiplexer and the appertaining multiplexer 53 are driven by two different, but identically fashioned pseudo-random number generators 71, 72 that, due to their identical structure, supply the same random numbers at the same points in time given common clocking. Fundamentally, however, it is also possible to drive the demultiplexers 50, 52 and multiplexers 51, 53 with a clock signal itself, which is simpler in circuit-oriented terms but less secure. With a given chip area, a good compromise between optimally complete coverage of the chip surface with optimally narrow and closely adjacent interconnects and the wish for optimally little circuit-oriented expenditures can be found on the basis of this inventive development of a protective circuit.

The above-described circuit is illustrative of the principles of the present invention. Numerous modifications and adaptions thereof will be readily apparent to those skilled in this art without departing from the spirit and scope of the present invention.

What is claimed is:

1. A protective circuit for an integrated circuit, wherein said protective circuit is arranged in a circuit level at a location under or above said integrated circuit, said protective circuit comprising:

a plurality of interconnects that are charged with different signals of a signal generator;

a detector that evaluates said different signals transmitted via said plurality of interconnects for faulty behavior, said detector having an output at which, when said faulty behavior is found, a control signal is provided for switching said integrated circuit into a security mode;

a demultiplexer connected to one end of a first group of said plurality of interconnects, said demultiplexer combining said group of plurality of interconnects;

a respective multiplexer connected to an other end of said group of said plurality of interconnects;

a single signal generator that is connected to said demultiplexer;

a single signal detector that is connected to said multiplexer;

a selection signal generator that drives an entity selected from the group consisting of said multiplexer and said demultiplexer; and a demultiplexer connected to one end of a first group of said plurality of interconnects, said demultiplexer combining said group of a plurality of interconnects.

2. A protective circuit according to claim 1, wherein said plurality of interconnects are extended over a plurality of circuit levels of said protective circuit.

3. A protective circuit according to claim 1, wherein said interconnects are fashioned such that said integrated circuit is largely covered to prevent access without damage to said integrated circuit or interruption of one of said plurality of interconnects.

4. A protective circuit according to claim 1, wherein said plurality of interconnects are fashioned with a narrow width so that they will be interrupted by an intrusion attempt.

5. A protective circuit according to claim 1, wherein said detector is arranged in a circuit level under a circuit level with said plurality of interconnects and protected against access by these interconnects.

6. A protective circuit according to claim 1, wherein said generator is arranged in a circuit level under a circuit level with said plurality of interconnects and protected against access by these interconnects.

7. A protective circuit according to claim 1, wherein said different signals are generated independently of one another.

8. A protective circuit according to claim 1, wherein said generator for different signals are fashioned such that said signals dynamically vary over time.

9. A protective circuit according to claim 1, further comprising a plurality of detectors that are allocated to one of said plurality of interconnects and a signal on this interconnect can be monitored.

10. A protective circuit according to claim 1, wherein said selection signal generator is a random number generator.

11. A protective circuit according to claim 1, wherein said selection signal generator is a pseudo-random number generator.

12. A protective circuit is according to claim 1, further comprising multiple detectors that are networked with one another.

13. A protective circuit according to claim 1, further comprising multiple signal generators that are networked with one another.

14. A protective circuit according to claim 1, wherein said integrated circuit is surrounded by a plurality of circuit levels of said protective circuit, one of said plurality of circuit levels being above said integrated circuit, and one of said plurality of circuit levels being below said integrated circuit.

15. A protective circuit according to claim 1, further comprising a unit for determining an integrity value of a signal supplied to said detector, and said integrity value is interpreted for detecting a faulty behavior.

16. A protective circuit for an integrated circuit, whereby the protective circuit is arranged in one or more circuit levels located in at least one position consisting of under and over the integrated circuit, the protective circuit comprising:

at least one interconnect that is charged with at least one signal of at least one signal generator; and at least one detector that evaluates the at least one signal transmitted via the at least one interconnect for faulty behavior, and is configured so that when this faulty behavior is found, it can output a control signal for switching the integrated circuit into a security mode, wherein the at least one signal generator is configured to randomly select a type of the at least one signal and transmits a signal indicative of the type of the at least one signal to the at least one detector.

* * * * *